No. 772,818. PATENTED OCT. 18, 1904.
C. OLSON.
VEHICLE TIRE.
APPLICATION FILED JULY 30, 1903.
NO MODEL.
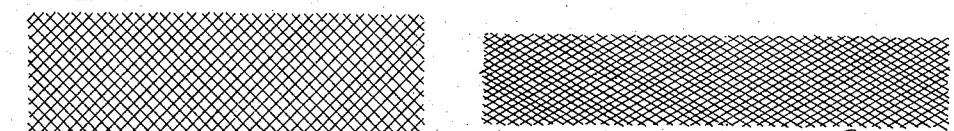
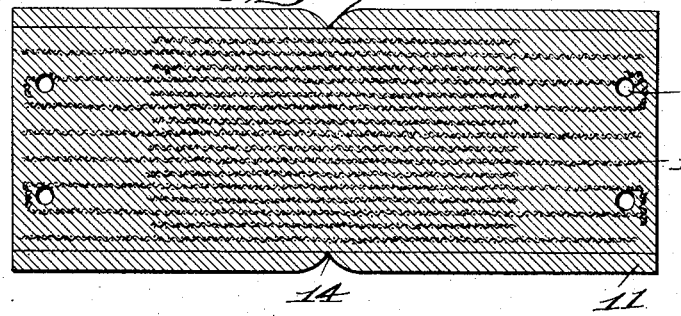
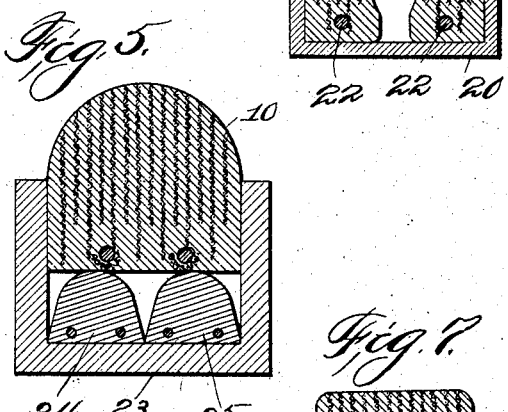
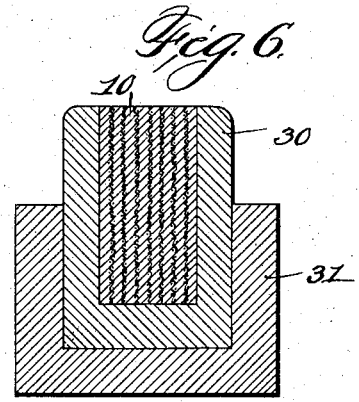
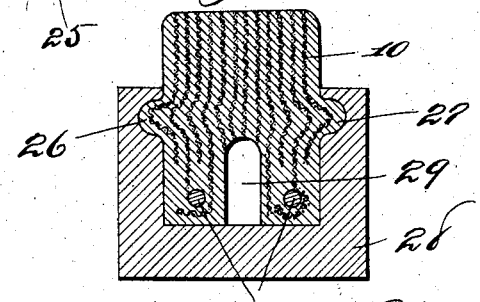
Attest:
F. F. Feibrock.
R. C. Orwig.
Inventor
Charles Olson
by J. E. Swett Atty.

No. 772,818. Patented October 18, 1904.

UNITED STATES PATENT OFFICE.

CHARLES OLSON, OF DES MOINES, IOWA, ASSIGNOR, BY MESNE ASSIGNMENTS, TO WOVEN WIRE RUBBER COMPANY, A CORPORATION OF NEW YORK.

VEHICLE-TIRE.

SPECIFICATION forming part of Letters Patent No. 772,818, dated October 18, 1904.

Application filed July 30, 1903. Serial No. 167,603. (No model.)

*To all whom it may concern:*

Be it known that I, CHARLES OLSON, a citizen of the United States of America, and a resident of Des Moines, Polk county, Iowa, have invented a new and useful Cushion Vehicle-Tire, of which the following is a specification.

The object of this invention is to provide an improved construction for vehicle-tires.

A further object of this invention is to be found in the provision of a composite substance of yielding, compressible, elastic, expansive, and cohesive characteristic for use in the construction or formation of vehicle-tires.

A further object of this invention is to be found in the manufacture of vehicle-tires from a cohesive, resilient, compressible, expansive, or yielding substance having incorporated therein strips of wire-cloth.

My invention consists in the substance or composition of matter for use in the manufacture of vehicle-tires, which composition of matter comprises wire-cloth filled with cohesive, resilient, compressible, expansive, or yielding substance.

My invention consists, further, in the construction or manufacture of vehicle-tires of strips of wire-cloth placed face to face and the interstices thereof filled with cohesive, resilient, compressible, expansive, or yielding substance.

My invention consists, further, in the manufacture of vehicle-tires partly of rubber and partly of a substance composed of strips of wire-cloth placed face to face and the interstices thereof filled with cohesive, resilient, compressible, expansive, or yielding substance.

My invention consists, further, in the manufacture of vehicle-tires of a substance composed of strips of wire-cloth cut on the bias and placed face to face and the interstices thereof filled with cohesive, resilient, compressible, expansive, or yielding substance.

My invention consists, further, of the manufacture of vehicle-tires partly of rubber and partly of a composition consisting of sheets of wire-cloth cut on the bias and placed face to face, the interstices thereof filled with cohesive, resilient, compressible, expansive, or yielding substance.

My invention consists, further, of the manufacture of vehicle-tires of a substance composed of strips of wire-cloth cut on the bias and placed face to face in such manner that the edges of the strips (composed solely of end portions of the wire strands of the cloth) are presented, respectively, to a wheel-rim and to the tread-surface over which a wheel may travel, the interstices of the wire-cloth filled with cohesive, resilient, compressible, or yielding substance.

My invention consists, further, of the manufacture of vehicle-tires of a substance composed of strips of wire-cloth cut on the bias and placed face to face in such manner that the edges of the strips (composed solely of end portions of the wire strands of the cloth) are presented, respectively, to a wheel-rim and to the tread-surface over which a wheel may travel, the interstices of the wire-cloth filled with cohesive, resilient, compressible, or yielding substance, said cohesive, resilient, compressible, expansive, or yielding substance vulcanized with the wire-cloth into the nearest approach possible to a homogeneous mass, one or more of the strips of wire-cloth folded so as to pass around the lower side of a hole or aperture provided for a retaining device.

My invention consists, further, in the details of construction, arrangement, and combination of elements hereinafter set forth, pointed out in my claims, and illustrated by the accompanying drawings, in which—

Figure 1 is a face view of one of the strips of wire-cloth employed in my improved manufacture in its normal unpressed state. Fig. 2 is a plan or face view of the strip of wire-cloth shown in Fig. 1, the strands thereof in the position assumed when said strip is compressed by the application thereto of a heavy weight. It is to be understood that Figs. 1 and 2 are diagrams illustrating the forms of the strips of wire-cloth employed in the construction hereinafter described, and the position shown in Fig. 2 is that assumed by each of the inner strips of the cloth when the tire is subjected to heavy weight. Fig. 3 is a cross-section illustrating the manufacture of substance for use as vehicle-tires. Fig. 4 is a cross-section of one form of vehicle-tire made of the substance illustrated in Figs. 1, 2, and 3. Fig. 5 is a cross-section of another form of vehicle-tire made from the substance illustrated in Figs. 1, 2, and 3 and mounted on cushions in a wheel-rim. Fig. 6 is a cross-section illustrating another form of vehicle-tire made of rubber with an insert, panel, or rim of the substance illustrated in Figs. 1, 2, and 3, the tire thus made mounted in a wheel-rim. Fig. 7 is a cross-section illustrating another form of vehicle-tire made of the substance described in Figs. 1, 2, and 3 and mounted in a wheel-rim.

In the construction of the composition or article of manufacture or the useful device herein set forth the numeral 10 designates a strip of wire-cloth, preferably cut on the bias in such manner that the strands, warp, and woof of the fabric cross each other at right angles and extend at oblique angles—preferably forty-five degrees—relative to the margins of the strip. The ends of the obliquely-positioned wires of the strip, warp, and woof of the fabric are not connected, but extend, as shown in the other figures of the drawings, to form edges of the complete device. Sheets 10 or strips of the wire-cloth are positioned face to face and may vary in width and length as desired. In Figs. 3, 4, 5, and 7 of the drawings I illustrate the sheets or strips of wire fabric of various and irregular widths, while in Fig. 6 of the drawings I show the sheets or strips of the same width. It is to be understood that the length of the strips may be greater or less than the length of a given vehicle-tire. The strips or sheets after they are laid face to face are molded with a quantity of cohesive, resilient, compressible, expansive, or yielding substance 11, such as india-rubber, and said substance is compressed or subjected to pressure in such manner that it will pass within the meshes and interstices of some or all of the sheets or strips 10. The cohesive, resilient, compressible, expansive, or yielding substance 11 is then vulcanized under pressure in a mold or former, or otherwise, to the end that the composite substance produced by such vulcanizing of the substance in contact with the wire fabric will approach as nearly as possible to a homogeneous condition.

In Fig. 3 I illustrate a strip, block, or article of manufacture approximating in width to double the thickness desired for the resilient tires, and said article of manufacture may have holes or bores 12 longitudinally thereof and notches, grooves, or creases 13 14 longitudinally of its central portion. In this form of device or article of manufacture I prefer to employ alternate wide and narrow strips or sheets 10, having their centers at the center of the resultant block, and then cut, rip, or sever the block on the lines of the creases or grooves 13 14, and thereby produce two strips, blocks, or articles susceptible of use as vehicle-tires. When the block or strip is cut at the line of the creases or grooves 13 14, the cut faces thus exposed form the tread-surfaces of the resultant tire, which tire may be mounted in the channel-rim or otherwise fixed to a vehicle-wheel in any desired manner, the bores or holes 12 longitudinally of the tires being provided for the insertion of bond-wires, as shown in Figs. 4, 5, and 7 of the drawings. I do not wish to be understood as limited to the use of the bond-wire for fastening the tires to the wheel-rims, since many different devices for fastening means are now common and well known and may be employed interchangeably. It will be observed that the cut faces of the tire resulting from a severance or division of the block shown in Fig. 3 and containing the strips of wire-cloth having the wires, threads, or strands thereof positioned obliquely to the tread-surface and held together with the cohesive substance will be noiseless and yet compressible and resilient to a maximum degree, for the reason that the wires, thread, or strands will yield vertically under pressure and impact and yield relative to each other at the points of crossing, as shown in Fig. 2, and react or recover partly through the resilience of the wires, threads, or strands and partly through the resilience of the cohesive substance. This device also has this quality, that the metallic portions of the block, strip, or tire will wear and the cohesive portions will abrade, spread, and cover the ends of the metallic portions, but will not mash or spread to so great an extent as would be the case if the metallic portions were omitted, and at the same time the frayed and abraded portions of the cohesive substance will project beyond the metallic portions of the tread-surface and furnish a cushion-tread for impact prior to the engagement of the metallic portions.

In Fig. 4 of the drawings I show a composite block or strip 15 composed of sheets or strips of bias-cut fabric 10 embedded in cohesive substance and formed with a rounded or transversely-curved tread-face, to which the margins of the metallic strips project and an angular inner portion notched at 16 17 in the sides of the block to receive inturned flanges 18 19 of a wheel-rim 20. In this form of tire I provide a concavity or longitudinal groove 21 in the inner surface of the composite block, and said block or tire may be retained in the channel-rim by contact of the flanges only or by the use of bond-wires 22 in a common manner.

In Fig. 5 I show a composite block or strip composed of parallel sheets or strips of bias-cut fabric 10 embedded in cohesive substance and mounted in a channel-rim 23, rubber cushions 24 25 being mounted in said channel-rim and supporting the tire by contact with its inner face. In this construction the cushions 24 25 are formed with flat faces resting in contact with the channel-rim and convex faces carrying the composite block, strip, or tire, and each, either, or all of the cushions and tires in the rim may be connected thereto, bound, or fastened in any desired manner.

In Fig. 7 I show a composite block, strip, or tire formed of a plurality of bias-cut sheets of wire fabric 10, arranged approximately parallel with each other and embedded in cohesive substance, with projections or ribs 26 27 mating and fitting in grooves on the inner face of the flanges of a channel-rim 28. In this construction also I provide a groove or cavity 29 in the inner face of the tire, and said tire may be mounted in the channel-rim and retained by contact of the projections or ribs 26 27 in the grooves of the wheel-rim or by the use of other means of fastening, such as bond-wires 22.

In each of the constructions shown in Figs. 4, 5, and 6 I provide an air space or cavity in the interior of the tire, which serves as a cushion and increases or augments the resilience and compressibility of the composite block.

In Fig. 6 I show a tire 30, of rubber or other suitable material, mounted in a wheel-rim 31, where it may be fastened by any desired means. The tire 30 is formed with an annular groove in its outer face, and said groove is filled with a composite block composed of bias-cut strips of wire fabric 10 embedded in cohesive substance. In this instance, as in all the others illustrated herewith, the major portion of the tread-surface of the tire is protected by the resiliently-projecting end portions of the warp and woof wires of the bias-cut fabric.

When bond-wires 22 are employed to secure and retain the complete tire in a wheel rim or channel, such as is illustrated in Figs. 4, 5, and 7, one or more of the sheets or strips of wire-cloth 10 are folded or bent around and beneath the apertures arranged to receive said bond-wires. In such position said folded strips or sheets of wire-cloth serve to protect the apertures and prevent cutting of the bond-wires through the inner portion of the tire.

For the present, and so far as is now known to me, I employ and will employ india-rubber for the cohesive, resilient, compressible, expansive, or yielding substance vulcanized in contact with the strips 10 of wire fabric cut on the bias, as described; but I wish to be understood as including in my invention the use of any substance which may be preferred to india-rubber, whether now known or hereafter discovered, or any substance in imitation of india-rubber, such as shoddy, which may be composed of a mixture of felt and india-rubber or made by a re-covering and re-forming of substance composed of fabric and india-rubber, since numerous commercial articles are now made from such shoddy and for some purposes have been found to approximate closely to pure india-rubber in utility.

I claim as my invention—

1. A vehicle-tire, comprising the strips of wire-cloth cut on the bias and the interstices thereof filled with cohesive substance and the whole formed and curved with the strands of the wire-cloth tangent to the arc of curvature.

2. A vehicle-tire, comprising strips of wire-cloth cut on the bias and the interstices thereof filled with cohesive substance, and the whole formed and curved on an arc intersecting trends of the strands of the wire-cloth.

3. A vehicle-tire, composed partly of rubber and partly of strips of wire-cloth embedded in the rubber, which tire is formed with a groove in its inner surface.

4. A vehicle-tire, composed partly of rubber and partly of strips of wire-cloth having their interstices filled with cohesive substance, said tire formed with a groove in its inner surface.

5. A vehicle-tire, composed of strips of wire-cloth and formed with a groove in its inner surface, some of the strips of wire-cloth bent around said groove, the interstices of the wire cloth filled with cohesive substance.

6. A vehicle-tire, composed of bias-cut strips of wire-cloth arranged face to face to form a tire having a groove in its inner face, some of said strips of wire-cloth extending to said groove and some of said strips extending past said groove, the interstices of the strips of wire-cloth filled with cohesive substance.

7. A vehicle-tire, composed of bias-cut strips of wire-cloth arranged face to face to form a tire having a groove in its inner face and longitudinal holes parallel with said groove, some of said strips of wire-cloth extending to said groove and some of said strips extending past said groove and around said holes, the interstices of the strips of wire-cloth filled with cohesive substance, and the whole curved on an arc intersecting the trends of the strands of wire-cloth.

8. A vehicle-tire, composed of bias-cut strips of wire-cloth arranged face to face to form a tire having a groove in its inner face, some of said strips of wire-cloth extending to said groove and some of said strips extending past said groove, the interstices of the strips of wire-cloth filled with cohesive substance vulcanized therein, and the whole bent on an arc intersecting the trends of the strands of wire-cloth.

9. A vehicle-tire, composed of elastic, cohesive material having embedded therein strips or sheets of woven-wire fabric, one or more of which sheets are folded around and below the hole or aperture provided in said tire for a retaining device.

10. A vehicle-tire, composed of elastic, cohesive material having embedded therein vertically-disposed sheets or sections of woven wire, one or more of said sheets or sections folded around the inner side of a hole or aperture provided in said tire for a retaining device.

11. A vehicle-tire, composed of strips of wire-cloth, one or more of said strips folded laterally, a cohesive elastic substance filling the interstices of said strips of wire-cloth and the whole formed and curved, said tire also formed with longitudinal holes adapted to receive retaining devices, said longitudinal holes protected by the folded portions of the strips of wire-cloth.

12. A vehicle-tire, comprising strips of wire-cloth, some of which strips are folded laterally, a cohesive elastic substance filling the interstices of the strips of wire-cloth, the whole formed and curved with the strands of the wire-cloth tangent to the arc of curvature, and formed with a longitudinal hole adapted to receive a retaining device, said longitudinal hole protected by the folded portions of the strips of wire-cloth.

13. A vehicle-tire, composed of strips of wire-cloth placed face to face perpendicular to the tread plane on which the tire is to be used, the interstices of the strips of wire-cloth filled with cohesive elastic substance, the complete tire formed with a longitudinal hole adapted to receive a retaining device, said longitudinal hole within and protected by the strips of wire-cloth.

14. The combination of a channel-rim, a vehicle-tire composed of strips of wire-cloth embedded in cohesive elastic substance and formed with longitudinal holes within and protected by said strips of wire-cloth, and retaining devices in said longitudinal holes.

Signed by me at Des Moines, Iowa, this 24th day of April, 1903.

CHARLES OLSON.

Witnesses:
S. C. SWEET,
W. BISHOP.